United States Patent
Ota et al.

(10) Patent No.: US 11,249,543 B2
(45) Date of Patent: Feb. 15, 2022

(54) IN-VEHICLE CONTROL DEVICE

(71) Applicants: TOYOTA JIDOSHA KABUSHIKI KAISHA, Toyota (JP); MAZDA MOTOR CORPORATION, Hiroshima (JP)

(72) Inventors: Naofumi Ota, Toyota (JP); Jiro Ito, Toyota (JP); Ryota Misumi, Toyota (JP); Kazuichi Fujisaka, Hiroshima (JP); Sadahisa Yamada, Hiroshima (JP)

(73) Assignees: TOYOTA JIDOSHA KABUSHIKI KAISHA, Toyota (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/998,070

(22) Filed: Aug. 20, 2020

(65) Prior Publication Data

US 2021/0064121 A1     Mar. 4, 2021

(30) Foreign Application Priority Data

Aug. 30, 2019  (JP) .............................. JP2019-157919

(51) Int. Cl.
*G06F 1/00* (2006.01)
*G06F 1/3296* (2019.01)
*G06F 1/28* (2006.01)

(52) U.S. Cl.
CPC .............. *G06F 1/3296* (2013.01); *G06F 1/28* (2013.01)

(58) Field of Classification Search
CPC ..................................................... G06F 1/3296
See application file for complete search history.

(56) References Cited

U.S. PATENT DOCUMENTS

| | | | |
|---|---|---|---|
| 8,380,400 B2* | 2/2013 | Kanai ..................... | B60L 50/16 701/48 |
| 8,907,680 B2* | 12/2014 | Sakakibara ............. | B60L 58/12 324/546 |
| 2006/0276947 A1 | 12/2006 | Kaita et al. | |
| 2010/0332085 A1* | 12/2010 | Song ....................... | B60P 1/431 701/49 |
| 2013/0321637 A1* | 12/2013 | Frank ................... | H04N 5/2257 348/152 |

(Continued)

FOREIGN PATENT DOCUMENTS

JP     2019-106724 A    6/2019

*Primary Examiner* — Mohammed H Rehman
(74) *Attorney, Agent, or Firm* — Oliff PLC

(57) ABSTRACT

An in-vehicle control device includes a processor configured to: control a device of a first type, which has a function of switching an operation mode between a normal mode and a mode in which power consumption is limited compared to the normal mode in accordance with an instruction via communication and a device of a second type, which does not have the function; specify a limited device that is a device of which power consumption is to be limited, based on information acquired from outside; transmit to the limited device via a communication line an instruction to shift the operation mode to the mode in which power consumption is limited compared to the normal mode, when the limited device is the device of the first type; and stop power supply to the limited device when the limited device is the device of the second type.

5 Claims, 2 Drawing Sheets

(56) References Cited

U.S. PATENT DOCUMENTS

| | | | |
|---|---|---|---|
| 2014/0052345 A1* | 2/2014 | Tobin | B60R 16/037 |
| | | | 701/49 |
| 2015/0112510 A1 | 4/2015 | Tokunaga et al. | |
| 2015/0264017 A1* | 9/2015 | Saed | H04L 67/125 |
| | | | 380/270 |

* cited by examiner

IN-VEHICLE CONTROL DEVICE

INCORPORATION BY REFERENCE

The disclosure of Japanese Patent Application No. 2019-157919 filed on Aug. 30, 2019 including the specification, drawings and abstract is incorporated herein by reference in its entirety.

BACKGROUND

1. Technical Field

The disclosure relates to an in-vehicle control device.

2. Description of Related Art

A vehicle is equipped with a plurality of devices such as in-vehicle devices referred to as electronic control units (ECUs) and electronic components. Since these devices are installed in large numbers, the devices are classified into several groups, and power supply therefor is controlled on a group basis using relays or the like.

In recent years, in order to improve services used in a vehicle, it is required to provide advanced functions, even in a parked vehicle, for example, such that many devices cooperate while performing wireless communication with a server outside the vehicle. Accordingly, power consumption of each device tends to increase. Thus, it is preferable to restrict operation of unnecessary functions as much as possible to restrict power consumption. However, there is a limit for restriction of the operation of unnecessary functions as long as power supply is controlled on a group basis.

Japanese Unexamined Patent Application Publication No. 2019-106724 (JP 2019-106724 A) describes a device that, when receiving a signal instructing switching of its operation mode, switches the operation mode in accordance with the signal independently of operation modes of the other devices connected to a bus to which that device is connected. The operation mode is switched between a normal mode (wake-up state) in which functions can be exhibited without any particular limitation and a power-saving mode (sleep state) in which the functions are restricted compared to the normal mode to limit power consumption. By employing such devices, even when the number of the devices is large, the functions of the devices can be restricted device-by-device, rather than on a group basis.

SUMMARY

A device having a function of switching an operation mode via communication has higher cost of parts etc., compared to a device having no such function, for supporting communication standards and operation mode switching control. In addition, since the device having the function consumes a certain amount of standby power even in a power-saving mode, an effect of limiting power consumption is limited when viewed over a relatively long time. Thus, even if all devices installed in the vehicle are replaced with devices having the function of switching the operation mode via communication, it is not necessarily optimal in terms of cost and limitation of power consumption.

The disclosure provides a control device that allows optimization of balance between cost and effects of limiting power consumption.

An aspect of the disclosure relates to an in-vehicle control device. The in-vehicle control device includes a processor. The processor is configured to control a device of a first type, which has a function of switching an operation mode between a normal mode and a mode in which power consumption is limited compared to the normal mode in accordance with an instruction via communication and a device of a second type, which does not have the function. The processor is configured to specify a limited device that is a device of which power consumption is to be limited, based on information acquired from outside. The processor is configured to transmit to the limited device via a communication line an instruction to shift the operation mode to the mode in which power consumption is limited compared to a normal mode when the limited device is the device of the first type. The processor is configured to stop power supply to the limited device when the limited device is the device of the second type.

In the in-vehicle control device of the above aspect, the information may be configured to be generated based on information including usage of a service while a vehicle is parked.

In the in-vehicle control device of the above aspect, the processor may be configured to specify, when there is a device of which power consumption is being limited, a non-limited device that is a device of which limitation of power consumption is to be removed based on the information. The processor may be configured to transmit to the non-limited device via the communication line an instruction to shift the operation mode to the normal mode when the non-limited device is the device of the first type. The processor may be configured to supply power to the non-limited device when the non-limited device is the device of the second type.

According to the above aspect, the control device can realize limitation of power consumption corresponding to each of the two types of the devices. Accordingly, it is possible to combine the devices of the two types to achieve a design that optimizes a balance between cost and effects of limiting power consumption.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control device according to an embodiment of the disclosure causes a first device of a first type, which has a function of switching an operation mode via communication, to use the function to shift the operation mode to a power-saving mode, thereby limiting power consumption. The control device stops power supply for a second device of a second type, which does not have the function of switching an operation mode via communication, thereby limiting power consumption. Thus, the control device can realize limitation of power consumption corresponding to each of the two types of the devices. Accordingly, using the control device, it is possible to combine the devices of the two types to achieve a design that optimizes a balance between reduction in cost and limitation of power consumption of a network system.

Embodiment

Hereinafter, an embodiment of the disclosure will be described in detail with reference to the drawings.

Configuration

Figure 1:
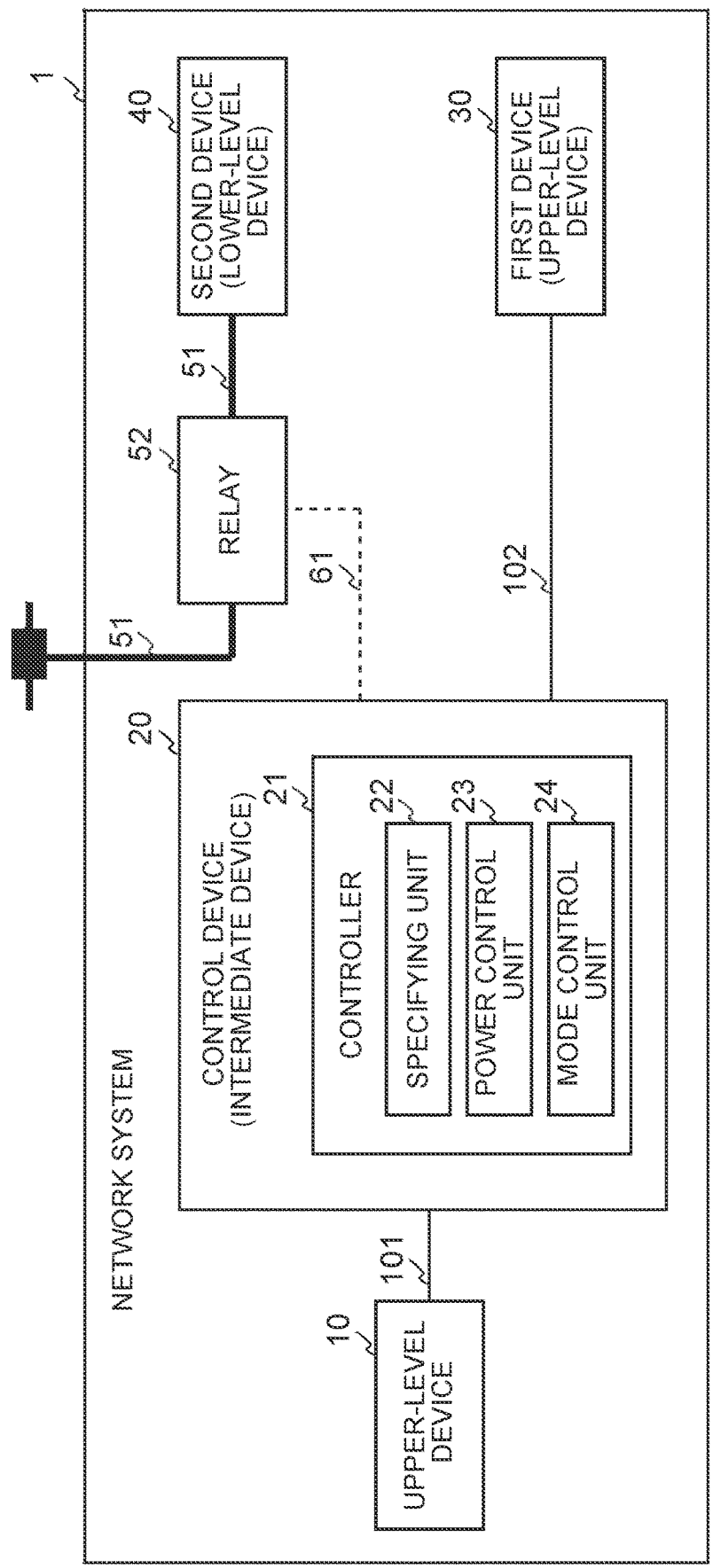
FIG. 1 is a configuration diagram of a control device according to an embodiment of the disclosure and a periphery thereof.

FIG. 1 is a configuration diagram of a control device 20 according to the embodiment of the disclosure and a periphery thereof.

In the present embodiment, a control device 20 is provided in a network system 1, for example. The control device 20 is a middle-level node (intermediate device) subordinate to an upper-level device 10 that is an upper-level node. Under the control device 20, there are a first device (lower-level device) 30 and a second device (lower-level device) 40 that are lower nodes. In the example illustrated in FIG. 1, one control device 20, and one first device 30 and one second device 40 subordinate to the control device 20 are shown. However, the control devices 20 are typically provided in various parts of the vehicle, and the first devices 30 and the second devices 40 subordinate to each control device 20 are provided in the vicinity of the control device 20.

The upper-level device 10 is, for example, a relatively advanced ECU that collectively performs calculations for various vehicle control functions.

The first device 30 and the second device 40 that are lower-level devices are, for example, sensors, actuators, or ECUs having relatively specialized functions for individually controlling the sensors or the actuators. The first device 30 has a function of switching an operation mode thereof, when receiving a signal instructing the switching of the operation mode via a communication line, between a normal mode and a power-saving mode in accordance with the signal. In the power-saving mode, functions of the first device 30 are restricted compared to the normal mode, thereby limiting power consumption. The second device 40 does not have the function of switching the operation mode. A device having the function of switching the operation mode, such as the first device 30, is herein referred to as a device of a first type, whereas a device having no function of switching the operation mode, such as the second device 40, is herein referred to as a device of a second type.

The control device 20 serving as an intermediate device is, for example, an ECU that functions as a gateway between the upper-level device 10 and the first and second devices 30, 40. The control device 20 is connected to the upper-level device 10 via a communication line 101 and is connected to the first device 30 subordinate to the control device 20 via a communication line 102.

In this example, the upper-level device 10 collects information on the vehicle and its surroundings from the first device 30 and the second device 40 that control sensors, via the control device 20 serving as the gateway. This information may include, for example, operation conditions of actuators, etc., driving conditions of the vehicle such as a speed and an acceleration of the vehicle, environmental conditions such as roads, objects, etc. surrounding the vehicle, seating statuses of occupants, and content of operations performed on various components of the vehicle. Note that some switches, sensors, and the like, such as a start switch, may be directly connected to the upper-level device 10. The upper-level device 10 may acquire information from these switches, sensors, and the like without intervention of the control device 20. The upper-level device 10 performs calculations based on the information to generate control data. The control data is data for controlling various functions of the vehicle, such as an autonomous driving function, a self-parking function, drive assistance functions including collision avoidance, lane keeping, follow-up of the preceding vehicle, and speed maintaining, operational control of an engine, a transmission, a cooling device, and air conditioner, charging and discharging control for a battery, lighting of headlamps in accordance with illuminance, permission of unlocking doors based on authentication using a mobile device (electronic key), and presentation of information to a user. The upper-level device 10 transmits the control data to the control device 20, and causes the control device 20 to perform operation corresponding to the control data. The upper-level device 10 also transmits the control data to the first device 30 and the second device 40 via the control device 20 serving as the gateway, so that the first device 30 and the second device 40 perform operation corresponding to the control data. The upper-level device 10 also generates scene information, which will be described later, as a kind of control data. In the network system 1, various control functions for the vehicle are concentrated in the upper-level device 10 having advanced functions, which makes the configurations of the control device 20, the first device 30, and the second device 40 relatively simple, and thus reduces an overall cost.

Each of the above devices is typically configured to include a controller such as a processor or a microcomputer and a memory. However, some lower-level devices may include a sensor or an actuator with no controller nor memory.

The upper-level device 10, the control device 20, the first device 30, and the second device 40 are supplied with power from a battery. FIG. 1 shows a power line 51 that is a power supply path to the second device 40, and power lines serving as power supply paths to the upper-level device 10, the control device 20 and the first device 30 are not shown. The power line 51 is provided with a relay 52, and power supply to the second device 40 is controlled by opening and closing the relay 52. Typically, power supply to two or more second devices 40 is allowed to be controlled through one power line 51 via the same relay 52, in consideration of cost of parts such as relays and power lines. In this case, the two or more second devices 40 belong to the same control group similarly to the related art. The opening and closing of the relay 52 is controlled by the control device 20 via a control line 61. The control signal to the relay 52 through the control line 61 is controlled by a general-purpose semiconductor relay included in the control device 20. Thus, when the relay 52 for the power source, for which characteristics of the second device 40, such as power consumption etc., needs to be taken into consideration, is provided separately from the control device 20, it is possible to achieve more versatile design of the control device 20. However, the relay 52 may be provided integrally with the control device 20.

Note that the second device 40 may be connected to the control device 20 via a communication line. For example, when the second device 40 is an ECU or the like having a communication function and controlled by the control device 20 such that the second device 40 is controlled through communication as well as power supply of the second device 40 is controlled using the relay 52, the second device 40 and the control device 20 are connected to each other via the communication line.

The control device 20 includes a controller 21 that performs the function as the gateway described above. Further, the controller 21 particularly includes a specifying unit 22, a power control unit 23, and a mode control unit 24, and controls power consumption described later. The specifying unit 22 specifies a device to be controlled among the subordinate first and second devices 30, 40 based on information acquired from the upper-level device 10. The mode control unit 24 transmits via the communication line an instruction to switch the operation mode to the first device 30 (the device of the first type) among the devices specified by the specifying unit 22. The power control unit 23 controls power supply to the second device 40 (the device of the second type) among the devices specified by the specifying unit 22 by controlling the relay 52. The connection topology of the network system 1 is not particularly limited as long as the control device 20 can perform control described above, and can be appropriately changed.

Processing

Figure 2:
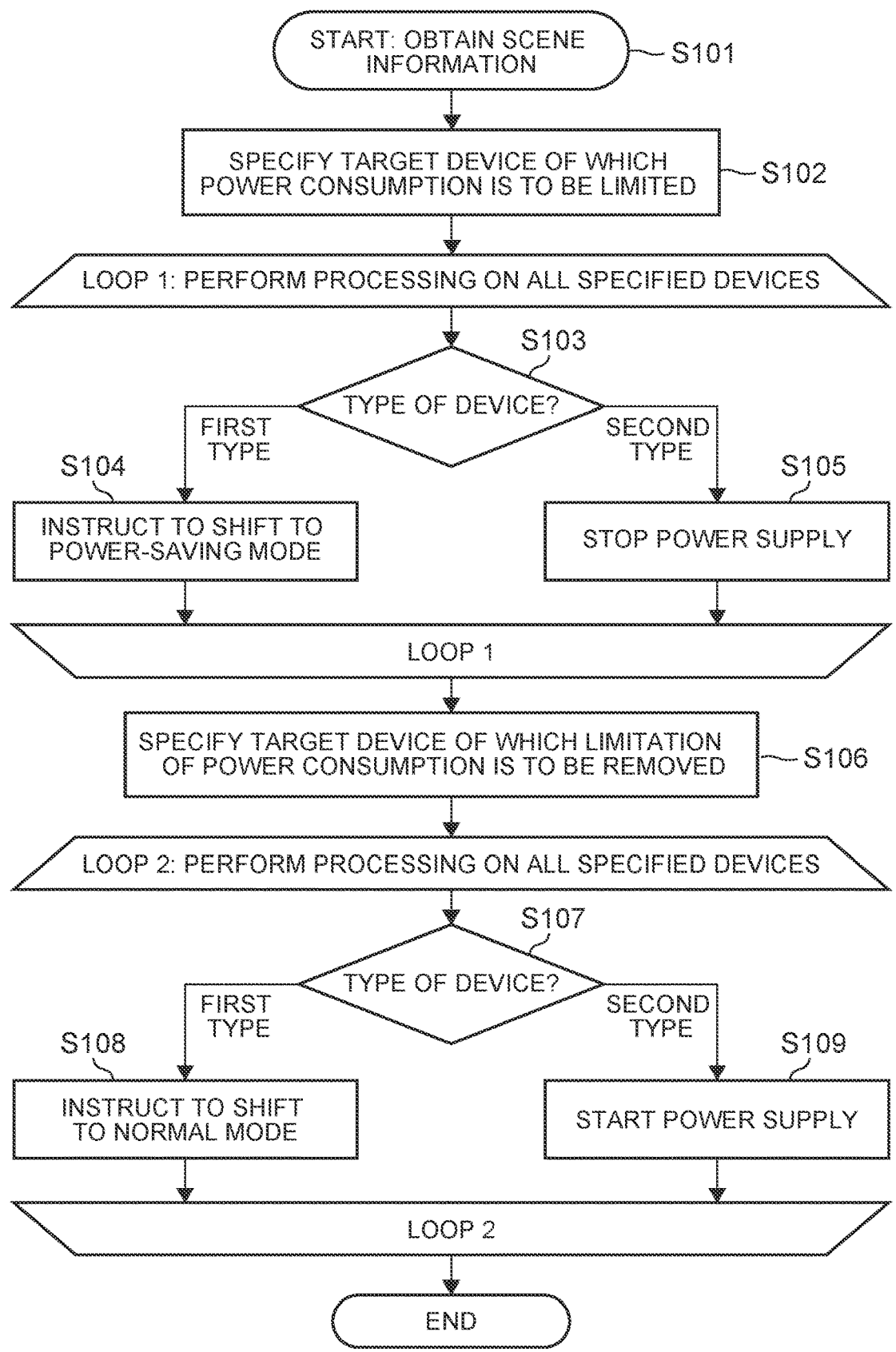
FIG. 2 is a flowchart showing processing of the control device according to the embodiment of the disclosure.

Hereinafter, processing of the network system 1 according to the present embodiment will be described with reference to the flowchart shown in FIG. 2.

Step S101

The controller 21 of the control device 20 starts processing by acquiring scene information from the upper-level device 10. The scene information is information that allows identification of content of power control of the first device 30 and the second device 40. The scene information is generated based on various kinds of information including information on scenes regarding the use of the vehicle, such as content of operation on various components of the vehicle, operation conditions of the components, usage of the services, vehicle traveling environment, etc., so as to reflect the scene. The upper-level device 10 can generate the scene information based on information acquired from the first and second devices 30, 40 in operation, sensors, switches, etc. directly connected to the upper-level device 10, and a predetermined generation rule. The generation rule is set in advance so that a necessary function can be performed depending on the scene and power consumption can be appropriately limited in accordance with functional configurations of the first device 30 and the second device 40 and specifications of vehicle control by the upper-level device 10. For example, by generating the scene information based on the usage of the service while the vehicle is parked, suitable power control during parking can be performed.

Step S102

The specifying unit 22 of the controller 21 in the control device 20 specifies a device whose functions may be restricted and power consumption is to be limited (also referred to as "limited device"), among the subordinate first and second devices 30, 40, based on the scene information. The specifying unit 22 has, for example, a table that defines the limited device in association with content of the scene information, and specifies the limited device based on the table. This table can be generated by the upper-level device 10 and received by the control device 20, for example.

Step S103

The controller 21 of the control device 20 sequentially selects one of the devices specified in step S102. When the selected device is the first device 30 of the first type, the process proceeds to step S104. When the selected device is the second device 40 of the second type, the process proceeds to step S105.

Step S104

The mode control unit 24 of the controller 21 in the control device 20 transmits via the communication line 102 an instruction to shift the operation mode to the power-saving mode to the first device 30 selected in step S103. When receiving the instruction, the first device 30 shifts the operation mode to the power-saving mode so that at least some functions are stopped to limit power consumption.

Step S105

The power control unit 23 of the controller 21 in the control device 20 stops power supply to the second device 40 selected in step S103. The power supply is stopped by controlling via the control line 61 the relay 52 connected to the power line 51 of the second device 40 to bring the relay 52 into an open state. When the power supply is stopped, the second device 40 stops functioning to limit power consumption (ideally, eliminate power consumption).

The processing of steps S103 to S105 is repeated until the processing is performed on all the devices specified in step S102, and thereafter, the process proceeds to subsequent processing.

Step S106

The specifying unit 22 of the controller 21 in the control device 20 specifies, among the subordinate first and second devices 30, 40, a device of which limitation of power consumption is to be removed (also referred to as "non-limited device") in order to exert the functions thereof, based on the scene information. The specifying unit 22 has, for example, a table in which the non-limited device is specified for each piece of the scene information, and specifies the non-limited device based on the table.

Step S107

The controller 21 of the control device 20 sequentially selects one of the devices specified in step S106. When the selected device is the first device 30 of the first type, the process proceeds to step S108. When the selected device is the second device 40 of the second type, the process proceeds to step S109.

Step S108

The mode control unit 24 of the controller 21 in the control device 20 transmits via the communication line 102 an instruction to shift the operation mode to the normal mode, in which the functions are not particularly restricted, to the first device 30 selected in step S107. Even in the power-saving mode, a minimum communication function operates in the first device 30 for standby for the instruction, so the first device 30 can receive the instruction. When receiving the instruction, the first device 30 shifts the operation mode to the normal mode, starts the stopped functions as needed, and does not limit power consumption as compared with the power-saving mode.

Step S109

The power control unit 23 of the controller 21 in the control device 20 starts power supply to the second device 40 selected in step S107. The power supply is started by controlling via the control line 61 the relay 52 connected to the power line 51 of the second device 40 to bring the relay 52 into a closed state. When the power supply is started, the second device 40 starts the stopped functions as needed.

The processing of steps S107 to S109 is repeated until the processing is performed on all the devices specified in step S106.

The processing is thus completed, but the order of the steps is not limited to the above as long as power consumption of each device can be limited and the limitation can be canceled in accordance with the scene information. For example, the upper-level device 10 transmits the scene information to the control device 20 each time the scene information changes, and the processing of steps S101 to S109 is performed each time the control device 20 acquires the scene information. Note that, even when receiving an instruction to shift the operation mode, the first device 30 may not follow the instruction depending on the processing being performed at that time, for example. Further, there is a possibility that a failure may occur in opening/closing control of the relay 52. The upper-level device 10 may determine whether the switching of the operation mode of the first device 30 and the switching of the state of power supply to the second device 40 have been performed as controlled, by acquiring actual states of the first device 30 and the relay 52 through the control device 20, and may reflect the determination result in the subsequent control so as to improve accuracy of the control.

Effects

In the control device 20 according to the present embodiment, the first device 30 of the first type, which has the function of switching the operation mode via communication, uses the function to shift the operation mode to the power-saving mode, thereby limiting power consumption. The control device 20 stops power supply to the second device of the second type, which does not have the function of switching the operation mode via communication, thereby limiting power consumption. Thus, the control device 20 can realize limitation of power consumption corresponding to each of the two types of the devices. Accordingly, using the control device 20, it is possible to weigh merits and demerits of the first device 30 and the second device 40 so that the network system 1 can be designed with the balance between the limitation of power consumption and the reduction in cost. The first device 30 has relatively high cost and uses standby power, but individual control of power consumption thereof can be easily performed via communication. The second device 40 has relatively low cost and does not use standby power, but may be controlled on a group basis depending on a limitation to the number of relays or power lines. For example, the following design can be realized. That is, the first device 30 is adopted for some devices, so that unnecessary functions are further restricted to keep the maximum power consumption equal to or lower than an allowable value. Meanwhile, the second device 40 is adopted for the remaining devices, so that cost and power consumption for standby while the function is restricted can be kept to be equal to or lower than their allowable values.

In the present embodiment, when a device such as an actuator is newly added to the network system 1, the new device may be provided as the first device 30 of the first type and connected to the communication line, and no additional relay or wire etc. is required, which facilitates the design of the network system 1. In addition, when a new service is supported after shipment of the vehicle, the upper-level device 10 updates the above-described generation rule to generate scene information corresponding to the new service. This allows the control device 20 to perform the power control of the first device 30 and the second device 40 corresponding to the new service without changing wiring etc. of the first device 30 and the second device 40. This makes follow-up of the new service easy.

The disclosure can be construed as not only a control device, but also a network system including a control device, a control method performed by a control device having a processor and a memory, a control program, a computer-readable non-transitory storage medium storing a control program, a vehicle equipped with a network system, and the like. Furthermore, the disclosure can be applied to devices other than the in-vehicle control device.

The disclosure is useful for a control system installed in a vehicle or the like.

What is claimed is:

1. An in-vehicle control device comprising a processor configured to:
   control (i) a device of a first type, which is configured to switch an operation mode between a normal mode and a limit mode in which power consumption is limited compared to the normal mode and (ii) a device of a second type, which is not configured to switch the operation mode between the normal mode and the limit mode;
   specify a limited device that is a device of which power consumption is to be limited, based on information acquired from outside;
   transmit to the limited device via a communication line an instruction to shift the operation mode to the limit mode when the limited device is the device of the first type configured to switch the operation mode; and
   stop power supply to the limited device when the limited device is the device of the second type not configured to switch the operation mode.

2. The in-vehicle control device according to claim 1, wherein the information acquired from the outside is generated based on information including usage of a service while a vehicle is parked.

3. The in-vehicle control device according to claim 2, wherein
   the processor is configured to:
      specify, when power consumption is being limited to at least one of the device of the first type and the device of the second type, a non-limited device that is a device of which limitation of power consumption is to be removed based on the information acquired from outside;
      transmit to the non-limited device via the communication line an instruction to shift the operation mode to the normal mode, when the non-limited device is the device of the first type configured to switch the operation mode; and
      supply power to the non-limited device, when the non-limited device is the device of the second type not configured to switch the operation mode.

4. The in-vehicle control device according to claim 1, wherein
   the processor is configured to:
      specify, when power consumption is being limited to at least one of the device of the first type and the device of the second type, a non-limited device that is a device of which limitation of power consumption is to be removed based on the information acquired from the outside;
      transmit to the non-limited device via the communication line an instruction to shift the operation mode to the normal mode, when the non-limited device is the device of the first type configured to switch the operation mode; and
      supply power to the non-limited device, when the non-limited device is the device of the second type not configured to switch the operation mode.

5. The in-vehicle control device according to claim 1, wherein
   the device of the first type is connected to a power source without a relay controlled by the in-vehicle control device, and
   the device of the second type is connected to the power source by a relay controlled by the in-vehicle control device.

* * * * *